Patented Mar. 19, 1940

2,194,179

UNITED STATES PATENT OFFICE 2,194,179

THIAZOLE COMPOUND AND METHOD OF MAKING IT

Edwin R. Buchman, Pasadena, Calif. assignor to Research Corporation, New York, N. Y., a corporation of New York No Drawing. Application December 29, 1937, Serial No. 182,261

9 Claims. (Cl. 260—302)

This invention relates to thiazole compounds and methods of making them, and more particularly to thiazole compounds siutable for use in the synthesis of antineuritic compounds and methods of making such thiazole compounds.

This application is a continuation in part of my copending application Serial No. 11,682, filed March 18, 1935, Patent 2,133,969, October 25, 1938.

In an article entitled "Structure of vitamin $B_1$" published in the Journal of the American Chemical Society, vol. 58, p. 1063 (1936), the structural formula of vitamin $B_1$, also known as vitamin B and the antineuritic vitamin, is disclosed. This vitamin is useful as a therapeutic agent in the treatment of certain diseases, among which is beri beri. It is also useful as a supplement to certain foodstuffs for the promotion of growth and well being of animals including man. It has been found that vitamin $B_1$ is a chemical compound which comprises a thiazole derivative and a pyrimidine derivative in chemical combination. The present invention relates to the synthesis of thiazole derivatives and their salts which resemble or comprise the thiazole portion of vitamin $B_1$ and which may be intermediates suitable for combining with pyrimidine groups, or groups capable of being converted into pyrimidine groups, to form vitamin $B_1$ or related compounds.

An object of the invention is to provide thiazole compounds, and particularly those which are useful in the synthesis of vitamin $B_1$, or similar compounds.

A further object of the invention is to provide useful and effective methods of producing thiazole compounds of the types described.

Thiazole compounds embodying the invention have the general formulae:

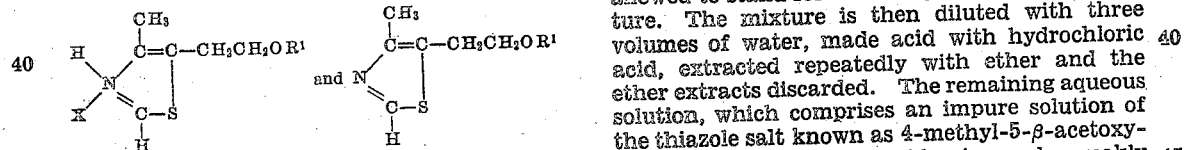

in which X represents an anion, such as an ionic halogen, and $R^1$ is an acid radical, for example, the acetate radical, or a substituted acid radical. Compounds of the type first indicated above, which are termed salts of thiazole derivatives, may be prepared by condensing a halogen ketonic compound of the type $CH_3COCHXCH_2CH_2OR^1$, in which X is a halogen of the group consisting of chlorine, bromine, and iodine, and $R^1$ has the same meaning as above, with thioformamide, $HCSNH_2$. Compounds of the second type, which are known as thiazole derivatives, may be readily prepared by removing the acid portions of the salts of these derivatives with an alkali. Salts of these thiazoles derivatives other than the halogen salts may be prepared by replacement of the halogens or by adding acids to the basic thiazole derivatives.

It is to be understood that the term "thiazole compounds" as used herein and in the annexed claims, is intended to include both the above described salts of thiazole derivatives and the thiazole derivatives themselves. Also the term "thiazole salts" means the salts of the thiazole derivatives mentioned above.

A specific example which will illustrate how the invention may be practiced is the condensation of thioformamide with γ chlor γ aceto propyl acetate, which has the formula $CH_3COCHClCH_2CH_2OCOCH_3$. Thioformamide is usually made by introducing formamide, $HCONH_2$, and phosphorus pentasulfide into dry ether, shaking or allowing the mixture to stand and removing the ether by distillation. The γ chlor γ aceto propyl acetate may be prepared in accordance with the process described in my copending application Serial No. 171,905, filed October 30, 1937, by treating γ aceto propyl acetate with a chlorinating agent, such as chlorine.

In this process the requisite weights of thioformamide and of γ chlor γ aceto propyl acetate are dissolved in alcohol and the solution allowed to stand, after which the product is purified by suitable operations. In one specific process 6.76 grs. of γ chlor γ aceto propyl acetate and 3.74 grs. of thioformamide hydrate are dissolved in 2.2 cc. of absolute ethyl alcohol and the mixture is allowed to stand for three days at room temperature. The mixture is then diluted with three volumes of water, made acid with hydrochloric acid, extracted repeatedly with ether and the ether extracts discarded. The remaining aqueous solution, which comprises an impure solution of the thiazole salt known as 4-methyl-5-β-acetoxy-ethyl thiazole hydrochloride, is made weakly alkaline to remove the hydrochloric acid from this salt and the solution is then extracted repeatedly with benzene. The benzene solution is dried with a suitable dehydrating agent and the benzene solution is concentrated in vacuo leaving the thiazole derivative designated 4-methyl-5-β-acetoxy-ethyl thiazole.

In a similar process γ iodo γ aceto propyl acetate is condensed with thioformamide to produce the hydriodide of 4-methyl-5-β-acetoxyethyl thiazole, from which the corresponding basic thiazole derivative may be readily obtained. The γ iodo γ aceto propyl acetate employed in this process may be prepared by treating γ chlor γ aceto propyl acetate with sodium iodide. Since γ iodo γ aceto propyl acetate is a rather unstable compound, it is better to start with the γ chlor γ aceto propyl acetate and to continue through the condensation with thioformamide without isolating the iodo acetate.

In practicing this process 44.6 grs. of γ chlor γ aceto propyl acetate are treated in ethyl alcohol solution with 37.5 grs. of sodium iodide, the mixture shaken and allowed to stand overnight. The alcohol is then removed by distillation in vacuo, five to six volumes of water are added to the residue and the solution is extracted with ether. The ether extracts are collected and dried over a suitable dehydrating agent, after which the ether is distilled off in vacuo leaving crude γ iodo γ aceto propyl acetate. The crude compound is then condensed at once with an equivalent quantity of thioformamide hydrated in ethyl alcohol. After standing three days, the resulting 4-methyl-5-β-acetoxy-ethyl-thiazole hydriodide is worked up in a manner analogous to that described hereinabove in connection with the related chlorine compound to obtain the product, 4-methyl-5-β-acetoxy-ethyl-thiazole, which is identical with the product described hereinabove.

By a similar process γ brom γ aceto propyl acetate may be condensed with thioformamide to obtain analogous results. The γ brom γ aceto propyl acetate employed may be prepared as described in my aforesaid application, Serial No. 171,905, by treating γ aceto propyl acetate with a brominating agent such, for example, as bromine.

The 4-methyl-5-β-acetoxy-ethyl-thiazole obtained by practicing these processes has the formula

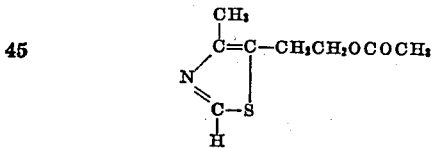

and this material forms addition products with acids, such as the hydrohalic acids, in which the acids are added directly to the nitrogen of the thiazole nucleus to form pentavalent nitrogen compounds which are termed salts. These salts have the general formula

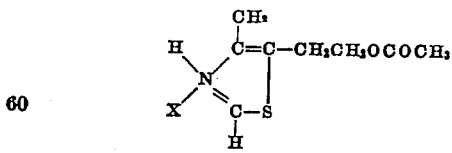

where X is an anion.

In the three processes described hereinabove for the production of the thiazole derivatives, the intermediates produced are the salts of hydrochloric, hydriodic and hydrobromic acids, respectively, and in the structural formula for the salts outlined hereinabove the anions represented by X would be the chlorine, iodine and bromine ions, respectively. When a solution of picric acid is added to a solution of this thiazole derivative, or to a solution of one of its salts, a characteristic picrate having a melting point of 131° C. is obtained.

These thiazole derivatives and their salts form valuable intermediate products for the production of vitamin B₁ and related compounds. For example, by a suitable reaction a pyrimidine derivative may affix itself to the nitrogen atom in one of the above described thiazole compounds, thereby producing a product similar to vitamin B₁ in which the pyrimidine and thiazole nuclei are in chemical combination. Thus, by a process analogous to that described by Williams and Cline in the article entitled "Synthesis of vitamin B₁" published in the Journal of the American Chemical Society, vol. 58, p. 1504 (1936), a 2-methyl-6-amino-5-halo-methyl pyrimidine may be caused to react with one of the thiazoles embodying the invention to produce a product which closely resembles vitamin B₁ in structure and properties and which is capable of being converted into the vitamin. Or, the thiazoles embodying the invention may be converted into 4-methyl-5-β-hydroxy-ethyl-thiazole and the latter compound used to make vitamin B₁ in accordance with the method disclosed in this publication.

The invention also embraces the production of other thiazole compounds in which the acetate radical in the compounds just described is replaced by other acid or substituted acyl acid radicals, such for example as the formic, propionic and butyric acid radicals. These compounds may be produced by condensing thioformamide with compounds of the type $CH_3COCHXCH_2CH_2OR^1$ in which X is a halogen of the group consisting of chlorine, iodine and bromine and $R^1$ is an acid radical or a substituted acid radical.

Since the thiazole portion of the antineuritic vitamin is the derivative known as 4-methyl-5-β-hydroxy-ethyl thiazole, it may be desirable to convert the thiazole compounds obtained by practicing the methods of this invention into that compound and this may be readily accomplished by hydrolyzing the compounds embodying this invention by means of a dilute acid. For example, 4-methyl-5-β-acetoxy-ethyl thiazole hydrochloride may be treated with a normal solution of hydrochloric acid at 100° C. for several hours to produce 4-methyl-5-β-hydroxy-ethyl thiazole hydrochloride. The other compounds embraced within this invention may be hydrolyzed to produce related compounds in a similar manner.

It will of course be understood that other solvents and reagents may be employed to assist in carrying out the reactions and to purify the product obtained. Furthermore, it may be necessary to vary the relative proportions of the ingredients, the time and/or temperature of the reactions in accordance with the particular derivative which is to be produced. However, these variations are such as are clearly understood by those familiar with the art.

What is claimed is:

1. The method of making thiazole compounds which comprises condensing with thioformamide a compound having the formula $$CH_3COCHXCH_2CH_2OR^1$$

in which X is a halogen of the group consisting of chlorine, iodine and bromine and $R^1$ is an acid radical.

2. The method of making thiazole compounds which comprises condensing with thioformamide a compound having the formula $$CH_3COCHXCH_2CH_2OCOCH_3$$

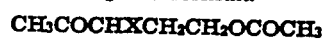

in which X is a halogen from the group consisting of chlorine, iodine and bromine.

3. The method of making thiazole compounds which comprises condensing γ chlor γ aceto propyl acetate with thioformamide.

4. The method of making thiazole compounds which comprises condensing γ iodo γ aceto propyl acetate with thioformamide.

5. The method of making thiazole compounds which comprises condensing γ brom γ aceto propyl acetate with thioformamide.

6. The method of making thiazole compounds which comprises condensing with thioformamide a compound having the formula $$CH_3COCHXCH_2CH_2OR^1$$

in which X is a halogen of the group consisting of chlorine, iodine and bromine and $R^1$ is an acid radical, and hydrolyzing the resulting compound to produce 4-methyl-5-β-hydroxyl-ethyl thiazole.

7. The method of making thiazole derivatives which comprises condensing with thioformamide a compound having the formula $$CH_3COCHXCH_2CH_2OR^1$$

in which X is a halogen of the group consisting of chlorine, iodine and bromine and $R^1$ is an acyl acid radical, and treating the resulting product with an alkali.

8. The method of making thiazole compounds which comprises condensing with thioformamide a compound having the formula $$CH_3COCHXCH_2CH_2OCOCH_3$$

in which X is a halogen from the group consisting of chlorine, iodine and bromine, and hydrolyzing the resulting compound to produce 4-methyl-5-β-hydroxy-ethyl thiazole.

9. The method of making thiazole compounds which comprises condensing with thioformamide a compound having the formula $$CH_3COCHXCH_2CH_2OCOCH_3$$

in which X is a halogen from the group consisting of chlorine, iodine and bromine, and treating the resulting product with an alkali.

EDWIN R. BUCHMAN.